United States Patent
Nelson, Jr.

(10) Patent No.: US 10,918,937 B2
(45) Date of Patent: Feb. 16, 2021

(54) DYNAMIC GAMEPLAY SESSION MANAGEMENT SYSTEM

(71) Applicant: Electronic Arts Inc., Redwood City, CA (US)

(72) Inventor: John Vincent Nelson, Jr., Marina Del Rey, CA (US)

(73) Assignee: ELECTRONIC ARTS INC., Redwood City, CA (US)

( * ) Notice: Subject to any disclaimer, the term of this patent is extended or adjusted under 35 U.S.C. 154(b) by 0 days.

(21) Appl. No.: 16/682,612

(22) Filed: Nov. 13, 2019

(65) Prior Publication Data

US 2021/0016166 A1  Jan. 21, 2021

Related U.S. Application Data

(60) Provisional application No. 62/874,912, filed on Jul. 16, 2019.

(51) Int. Cl.
*A63F 13/335* (2014.01)
*A63F 13/25* (2014.01)
*A63F 13/85* (2014.01)

(52) U.S. Cl.
CPC ............ *A63F 13/335* (2014.09); *A63F 13/25* (2014.09); *A63F 13/85* (2014.09)

(58) Field of Classification Search
CPC ........ A63F 13/335; A63F 13/25; A63F 13/85; A63F 13/45; A63F 13/46; A63F 13/798; A63F 2300/61

USPC .......................................................... 463/42
See application file for complete search history.

(56) References Cited

U.S. PATENT DOCUMENTS

| | | | | |
|---|---|---|---|---|
| 8,241,129 | B2* | 8/2012 | O'Kelley, II | G07F 17/3276 463/42 |
| 8,651,961 | B2* | 2/2014 | Muller | A63F 13/45 463/42 |
| 9,120,020 | B2* | 9/2015 | Michel | A63F 13/12 |
| 2007/0191101 | A1* | 8/2007 | Coliz | A63F 13/12 463/42 |
| 2007/0191102 | A1* | 8/2007 | Coliz | A63F 13/795 463/42 |
| 2010/0056275 | A1* | 3/2010 | Wilson | A63F 13/71 463/32 |
| 2016/0001181 | A1* | 1/2016 | Marr | A63F 13/60 463/42 |

\* cited by examiner

*Primary Examiner* — Allen Chan
(74) *Attorney, Agent, or Firm* — Knobbe, Martens, Olson & Bear, LLP

(57) ABSTRACT

Embodiments of the present application provide a dynamic gameplay session management system that is configured to provide a gameplay tournament system. The system provides matching of teams and/or players during a series of gameplay sessions. A point threshold that a player or team must satisfy in order to unlock tournament victory conditions.

20 Claims, 4 Drawing Sheets

DYNAMIC GAMEPLAY SESSION MANAGEMENT SYSTEM

INCORPORATION BY REFERENCE TO ANY PRIORITY APPLICATIONS

Any and all applications for which a foreign or domestic priority claim is identified in the Application Data Sheet as filed with the present application are incorporated by reference under 37 CFR 1.57 and made a part of this specification.

BACKGROUND

Video games have increased in popularity in recent years. For example, there are video game tournaments and professional e-sports venues. These venues can host large game tournaments that can be broadcast to millions of viewers worldwide. Unlike many sporting events, an e-sports competition may not be conducted using a typical bracket system. Rather teams or individuals may play a set number of matches and the players that receive the most points at the end of the matches will win. This can result in an anticlimactic experience for both the players and viewers. In some instances, a player may win a tournament by generating the most points without winning a single match.

SUMMARY OF EMBODIMENTS

The systems, methods and devices of this disclosure each have several innovative aspects, no single one of which is solely responsible for the all of the desirable attributes disclosed herein. Details of one or more implementations of the subject matter described in this specification are set forth in the accompanying drawings and the description below.

One embodiment discloses a computer-implemented method for dynamically controlling execution of a series of multi-user gameplay sessions of a game application, the method comprising: by a server computing system comprising at least one hardware processor configured with computer executable instructions, receiving data associated with a plurality of users executing a game application; determining a first plurality of users of the plurality of users to participate in a gameplay session within the game application; initiating the gameplay session, wherein the gameplay session includes the first plurality of users controlling virtual characters within a shared instantiation of a virtual environment of the game application; receiving telemetry data associated with operation of the virtual characters of each of the first plurality of users during the gameplay session; calculating a performance metric for each of the first plurality of users based at least in part on the telemetry data received during the gameplay session; determining whether a match point threshold for the performance metric is satisfied after the gameplay session; based on a determination that the match point threshold has been satisfied by at least one user, updating a user status to an indicate a match point status, wherein match point status indicates that the match point threshold has been satisfied; and initiating a match point gameplay session, wherein the match point gameplay session includes a series termination condition and a match termination condition, wherein the series termination condition is achievable by users having match point status.

Various embodiments of the method may include one, all, or any combination of the following features. In some embodiments, the method includes, based on at least one user satisfying the match termination condition, instantiating a subsequent match point gameplay session. In some embodiments, the method includes, based on at least one user satisfying the series termination condition, providing an indication of the at least one user satisfying the series termination condition to the plurality of users and terminate the series of gameplay sessions. In some embodiments, the plurality of users are grouped into teams of two or more users, and determining whether a match point threshold for the performance metric is satisfied after the gameplay session further comprises determining whether the performance metric associated with the team satisfies the match point threshold. In some embodiments, the performance metric comprises at least one of a score value or a ranking relative to other users or the plurality of users. In some embodiments, telemetry data provides an indication of actions performed by virtual characters during the gameplay session, wherein different action performed by virtual characters provide different incremental values for the performance metric. In some embodiments, the method includes determining whether a threshold number of gameplay sessions had been satisfied for the series of gameplay sessions, and conduct a final gameplay session having a second series termination condition satisfiable by each user participating in the final gameplay session. In some embodiments, the method includes updating the performance metric during the gameplay session. In some embodiments, the method includes providing at least one of auditory or visual output to users within the gameplay session when updating the performance metric of one or more users. In some embodiments, the method includes providing at least one of auditory or visual output associated with a virtual character of a user having match point status.

Another embodiment discloses a server computing system for dynamically controlling execution of a series of multi-user gameplay sessions of a game application: by a one or more hardware processors configured with computer executable instructions that configure the server computing system to: receive data associated with a plurality of users executing a game application; determine a first plurality of users of the plurality of users to participate in a gameplay session within the game application; initiate the gameplay session, wherein the gameplay session includes the first plurality of users controlling virtual characters within a shared instantiation of a virtual environment of the game application; receive telemetry data associated with operation of the virtual characters of each of the first plurality of users during the gameplay session; calculate a performance metric for each of the first plurality of users based at least in part on the telemetry data received during the gameplay session; determine whether a match point threshold for the performance metric is satisfied after the gameplay session; based on a determination that the match point threshold has been satisfied by at least one user, update a user status to an indicate a match point status, wherein match point status indicates that the match point threshold has been satisfied; and initiate a match point gameplay session, wherein the match point gameplay session includes a series termination condition and a match termination condition, wherein the series termination condition is achievable by users having match point status.

Various embodiments of the system may include one, all, or any combination of the following features. In some embodiments, the computer executable instructions further configure the at least one hardware processor to, based on at least one user satisfying the match termination condition, instantiate a subsequent match point gameplay session. In some embodiments, the computer executable instructions further configure the at least one hardware processor to, based on at least one user satisfying the series termination condition, provide an indication of the at least one user satisfying the series termination condition to the plurality of users and terminate the series of gameplay sessions. In some embodiments, the plurality of users are grouped into teams of two or more users, and the computer executable instructions further configure the at least one hardware processor to determine whether the performance metric associated with the team satisfies the match point threshold when determining whether a match point threshold for the performance metric is satisfied after the gameplay session. In some embodiments, the performance metric comprises at least one of a score value or a ranking relative to other users or the plurality of users. In some embodiments, telemetry data provides an indication of actions performed by virtual characters during the gameplay session, wherein different action performed by virtual characters provide different incremental values for the performance metric. In some embodiments, the computer executable instructions further configure the at least one hardware processor to determine whether a threshold number of gameplay sessions had been satisfied for the series of gameplay sessions, and conduct a final gameplay session having a second series termination condition satisfiable by each user participating in the final gameplay session. In some embodiments, the computer executable instructions further configure the at least one hardware processor to update the performance metric during the gameplay session. In some embodiments, the computer executable instructions further configure the at least one hardware processor to provide at least one of auditory or visual output to users within the gameplay session when updating the performance metric of one or more users. In some embodiments, the computer executable instructions further configure the at least one hardware processor to provide at least one of auditory or visual output associated with a virtual character of a user having match point status.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION OF EMBODIMENTS

Introduction

Figure 1:
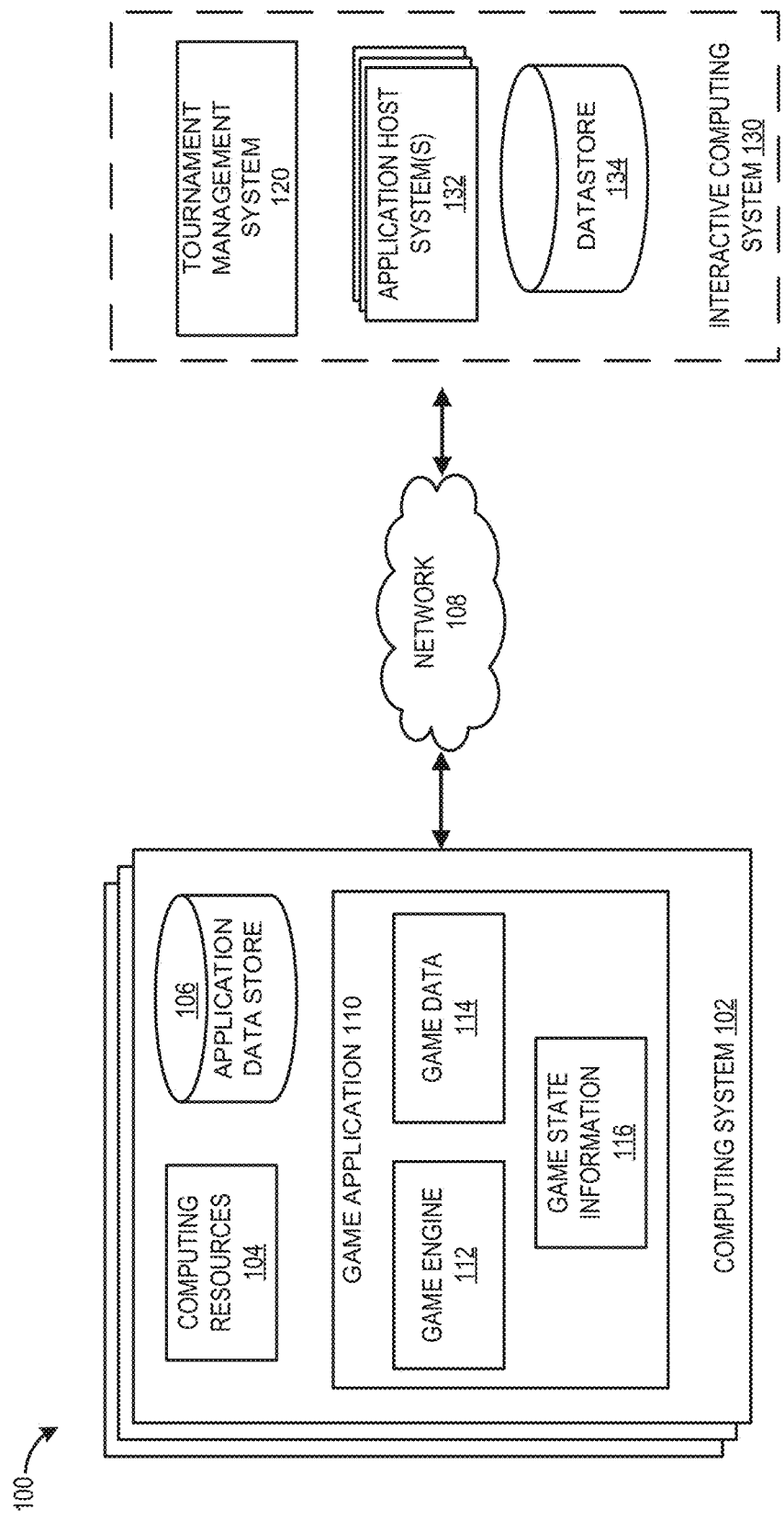
FIG. 1 illustrates an embodiment of a networked computing environment for implementing a video game tournament management system.

There exists a need to have a video game tournament system for multiplayer video games that can provide excitement for both the players and the viewers. In matches during a battle royale video game, the players or teams of players compete to be the last survivors at the end of the gameplay match. Each gameplay match includes a set number of players and/or teams. The last player or team alive at the end of the match receives a victory. In the case of a general tournament, players or teams can accumulate points through a series of gameplay matches, and the player or team who accumulates the most points is the winner. Players can earn points for victory and other actions during the gameplay match. For example, points may be generated based on the number of kills, the amount of damage dealt, the amount of damage taken, the time the player is alive, the distance traveled within the virtual environment, and/or events based on other telemetric gameplay data associated with the players during the gameplay session.

Such a tournament format can be rather unexciting if a player or team establishes an early lead that is mathematically impossible to overcome based on the amount points that can be earned in a game and the number of matches remaining. This can result in the tournament effectively ending before the last game. This can lead to an anticlimactic ending to the tournament and can leave players and viewers disappointed.

The tournament management system can provide a system that is configured to maintain excitement for the players and the viewers for the duration of the entire tournament. The tournament management system can provide a point threshold that a player or team must satisfy. After the player or team satisfies the point threshold, then the players/team unlock victory trigger conditions that, if satisfied result in the player/team winning the tournament. The victory trigger conditions can require the player/team to perform an event that increases the excitement generated during the tournament event. For example, the victory trigger condition may require the player/team to win a gameplay match in order to win the tournament. The victory trigger condition may require the player/team to complete an action or series of game actions to win the tournament. The tournament management system can determine the trigger condition that will help to build excitement during the tournament. The players and viewers will know exactly what needs to be done and how the tournament will declare a champion. Additionally, other players will be incentivized to stop the players that are in a position to win the tournament. After a player/team satisfies the point threshold, other players/teams may continue to earn points in order to satisfy the point threshold. Accordingly, the player/team that triggered the point threshold first will not necessarily be the winner. A subsequent player that satisfies the point threshold can then complete the victory condition and be the winner of the tournament. The tournament management system provides a system and process that allows players within the tournament to continue to compete and have a chance to win the tournament until the final victory condition is achieved. This can result in increased player and viewer engagement within the video game and tournament because it is uncertain who will win the tournament until the victory condition(s) are achieved.

"Player" refers to real-world users (e.g., people) playing a video game as opposed to characters that fictitiously exist in the video game.

"Character" refers to a virtual entity existing in a video game as opposed to real-world users, people, or players.

Overview of Tournament Management System

FIG. 1 illustrates an embodiment of a computing environment 100 for implementing a tournament management system 120. The environment 100 includes a network 108, a plurality of user computing systems 102, and an interactive computing system 130, the interactive computing system 130 includes the tournament management system 120. To simplify discussion and not to limit the present disclosure, the tournament management system 120 is illustrated as part of the interactive computing system 130, but may be a separate system that is independent of the interactive computing system 130.

The computing systems 102 may communicate via a network 108 with the tournament management system 120. Although only one network 108 is illustrated, multiple distinct or distributed networks 108 may exist. The network 108 can include any type of communication network. For example, the network 108 can include one or more of a wide area network (WAN), a local area network (LAN), a cellular network, an ad hoc network, a satellite network, a wired network, a wireless network, and so forth. In some embodiments, the network 108 can include the Internet.

Computing System

The computing system 102 includes computing resources 104 and an application data store 106. The user computing system 102 may have varied local computing resources 104 such as central processing units and architectures, memory, mass storage, graphics processing units, communication network availability and bandwidth, and so forth. Further, the user computing system 102 may include any type of computing system. For example, the user computing system 102 may be any type of computing device, such as a desktop, laptop, video game platform/console, television set-top box, television (for example, Internet TVs), network-enabled kiosk, car-console device, computerized appliance, wearable device (for example, smart watches and glasses with computing functionality), and wireless mobile devices (for example, smart phones, PDAs, tablets, or the like), to name a few. A more detailed description of an embodiment of a computing system 102 is described below with respect to FIG. 4.

Game Application

The user computing system 102 can include a game application 110 installed thereon. The user computing system 102 can execute a game application 110 based on software code stored at least in part in the application data store 106. The game application 110 may also be referred to herein as a video game, a game, game code or a game program. A game application 110 should be understood to include software code that a computing device 102 can use to provide a game for a user to play. A game application 110 may include software code that informs a computing device 102 of processor instructions to execute, but may also include data used in the playing of the game, such as data relating to game simulation, rendering, animation, and other game data. In the illustrated embodiment, the game application 110 includes a game engine 112, game data 114, and game state data 116. When executed, the game application 110 is configured to generate a virtual environment for a user to interface with the game application 110.

In some embodiments, the user computing system 102 can execute machine readable instructions that are configured to execute the game application 110, such as a video game, stored on a data store on the user computing system (for example, application data store 106). The game application 110 may be stored or executed in a distributed environment using a client/server architecture. For example, the user computing system 102 may execute a portion of a game application 110 and the interactive computing system 130, or an application host system 132 of the interactive computing system 130 may execute another portion of the game application 110. For instance, the game application 110 may be a competitive multiplayer online game, such as a battle royale type game, that includes a client portion executed by the user computing system 102 and a server portion executed by one or more application host systems 132. For the present discussion, the game application 110 can execute locally on the user computing system 102 or can execute as a distributed application that includes a portion that executes on the user computing system 102 and a portion that executes on at least one of the application host systems 132.

Game Engine

During operation, the game engine 112 executes the game logic, controls execution of the simulation of gameplay, and controls rendering within the game application 110. In some cases, the game engine 112 controls characters, the environment, execution of the gameplay, how the game progresses, or other aspects of gameplay based on one or more stored rule sets. For example, the game engine 112 can monitor gameplay and detect or determine a current runtime state of the game application 110. Based at least in part on the current runtime state of the game application, the game engine 112 applies a rule set to control the characters or the environment.

In some embodiments, the game engine 112 can include a simulation engine and a presentation engine. The simulation engine executes the game logic and controls execution of the gameplay simulation. The presentation engine controls execution of presentation of the gameplay and rendering of frames. In some embodiments, the game engine 112 can execute the functionality of the simulation engine and the presentation engine using different engines and/or processes within the game application.

The simulation engine can control execution of individual virtual components, virtual effects or virtual objects within the game application 110. The simulation engine can manage and determine character movement, character states, collision detection, derive desired motions for characters based on collisions, or the like. Input device(s) allow for user input to be received from the user in order to control aspects of the game application according to rule sets. The simulation engine receives the user inputs and determines character events, such as actions, collisions, runs, throws, attacks and other events appropriate for the game. The character events can be controlled by character movement streams that determine the appropriate motions the characters should make in response to events. The simulation engine can interface with a physics engine that can determine new poses for the characters. The physics engine can have as its inputs, the skeleton models of various characters, environmental settings, character states such as current poses (for example, positions of body parts expressed as positions, joint angles or other specifications), and velocities (linear or angular) of body parts and motions provided by a character movement module, which can be in the form of a set of force/torque vectors for some or all body parts. From this information, the physics engine generates new poses for the characters using rules of physics and those new poses can be used to update character states.

The simulation engine can output graphical state data (e.g., game state data 114) that is used by presentation engine to generate and render frames within the game application 110. In some embodiments, each virtual object can be configured as a state stream process that is handled by the simulation engine. Each state stream process can generate graphical state data for the presentation engine. For example, the state stream processes can include emitters, lights, models, occluders, terrain, visual environments, and other virtual objects with the game application 110 that affect the state of the game.

The presentation engine can use the graphical state data to generate and render frames for output to a display within the game application 110. The presentation engine can combine the virtual objects, such as virtual characters, animate objects, inanimate objects, background objects, lighting, reflection, and the like, in order to generate a full scene and a new frame for display. The presentation engine can take into account the surfaces, colors textures, and other parameters of the virtual objects. The presentation engine can then combine the virtual objects (for example, lighting within the virtual environment and virtual character images with inanimate and background objects) to generate and render a frame. During runtime, the game engine can output many frames per second (e.g., 30 FPS, 60 FPS, or any other number of frames per second as determined during execution of the game application).

Game Data

The game data 114 can include rule sets, prerecorded motion capture poses/paths, environmental settings, environmental objects, constraints, skeleton models, route information, or other game application information.

Rule sets can be applied by the game engine 112 to control characters, the environment, execution of the gameplay, how the game progresses, or other aspects of gameplay. The rule sets can define the specific way in which players (for example, player characters or non-player characters) or the environment behaves or interacts within the video game. For example, the rules sets can correspond to difficulty levels (for example, easy, normal, hard, novice, expert) of a video game. As another example, the rule sets can control a number of resources available to a player, a number of challenges a player must face to progress through the video game, rules for scoring, possible inputs, actions, events, movement in response to inputs, or the like. Further still, for instance in sports-related video games, the rules set can control a degree of skill or ability of a particular virtual player, team, or coach, or can dictate how virtual entities react to particular in-game situations, such as a breakaway, a 3-on-1 attack, a 3-on-1 defense, or the like. In some cases, rule sets can function as a virtual entities' brain or artificial intelligence.

The rule sets can be described using the concepts of characters, actions, runtime states, and environments. The virtual character in the video game can be a player character, which is controlled by a user, or a non-player character, which is controlled by the game application, and an action can be a move from a set of all possible moves the character can make. For example, in a hockey game, the character can pass (action A) or shoot (action B) the puck, among other possible actions. A runtime state can be described as a concrete and immediate situation in which the character finds itself. For example, the runtime state can be a specific place and moment, such as an instantaneous configuration that puts the character in relation to other significant things like tools, obstacles, enemies or prizes. A virtual environment can be described as the virtual world through which the character interacts with the game application. In general, a rule or rule set can define a character's way of behaving (for example, the character's actions) at a given time, runtime state, and environment.

At least a portion of the game data 114 can be stored in the application data store 106. In some embodiments, a portion of the game data 114 may be received or stored remotely, such as in the data store 134. Game data may be received during runtime of the game application 110. For example, in some cases, one or more rule sets can be received, stored, or applied during runtime of the game application 110.

Game State Information

During runtime of the game application 110, the game application 110 can collect or store game state data 118, which can include a game state, character states, environment states, scene object storage, route information, or information associated with a runtime state of the game application 110. For example, the game state data 118 can identify the state of the game application 110 at a specific point in time, such as a character position, character orientation, character action, game level attributes, and other information contributing to a state of the game application 110. The game state data can include simulation game state data and graphical game state data. The simulation game state data can include game state data that is used by the game engine 112 to execute the simulation of the game application 110. The graphical game state data can include game state data that is generated based on the simulation state data and is used to generate and render frames for output on a display.

Virtual Environment

As used herein, a virtual environment may include a simulated environment (for example, a virtual space) instanced on a user computing system 102, a server (for example, the interactive computing system 130) that is accessible by a client (for example, user computing system 102) located remotely from the server, to format a view of the virtual environment for display to a user of the client. The simulated environment may have a topography, express real-time interaction by the user, or include one or more objects positioned within the topography that are capable of locomotion within the topography. In some implementations, the topography may be a two-dimensional topography. In other instances, the topography may be a three-dimensional topography. In some implementations, the topography may be a single node. The topography may include dimensions of the virtual environment, or surface features of a surface or objects that are "native" to the virtual environment. In some implementations, the topography may describe a surface (for example, a ground surface) that runs through at least a substantial portion of the virtual environment. In some implementations, the topography may describe a volume with one or more bodies positioned therein (for example, a simulation of gravity-deprived space with one or more celestial bodies positioned therein). A virtual environment may include a virtual world, but this is not necessarily the case. For example, a virtual environment may include a game space that does not include one or more of the aspects generally associated with a virtual world (for example, gravity, a landscape, etc.). By way of illustration, the well-known game Tetris may be formed as a two-dimensional topography in which bodies (for example, the falling tetrominoes) move in accordance with predetermined parameters (for example, falling at a predetermined speed, and shifting horizontally or rotating based on user interaction).

The game instance of the video game 110 may include a simulated virtual environment, for example, a virtual environment that is accessible by users via clients (for example, user computing systems 102) that present the views of the virtual environment to a user. The virtual environment may have a topography, express ongoing real-time interaction by one or more users or include one or more objects positioned within the topography that are capable of locomotion within the topography. In some instances, the topography may include a two-dimensional topography. In other instances, the topography may include a three-dimensional topography. The topography may include dimensions of the space or surface features of a surface or objects that are "native" to the space. In some instances, the topography may describe a surface (for example, a ground surface) that runs through at least a substantial portion of the space. In some instances, the topography may describe a volume with one or more bodies positioned therein (for example, a simulation of gravity-deprived space with one or more celestial bodies positioned therein). The instance executed by the computer components may be synchronous, asynchronous, or semi-synchronous.

It should be understood the above description of the manner in which state of the virtual environment associated with the video game is not intended to be limiting. The game application 110 may be configured to express the virtual environment in a more limited, or richer, manner. For example, views determined for the video game representing the game state of the instance of the video game may be selected from a limited set of graphics depicting an occurrence in a given place within the video game. The views may include additional content (for example, text, audio, pre-stored video content, or other content) that describes particulars of the current state of the place, beyond the relatively generic graphics. For example, a view may include a generic battle graphic with a textual description of the opponents to be confronted. Other expressions of individual places within the video game are contemplated.

The game engine 112 generates game state data 118 that may be used locally within the game application 110 and may be transmitted to the interactive computing system 130 over network 108. The execution of the instance of the game application 110 may include determining a game state associated with the game application 110. The game state data 118 may facilitate presentation of views of the video game to the users on the user computing systems 102. The game state data 118 may include information defining the virtual environment in which the video game is played. The execution of the game engine is described in further detail herein.

The execution of the game instance may enable interaction by the users with the game application 110 or other users through the interactive computing system 130. The game application 110 may be configured to perform operations in the game instance in response to commands received over network 108 from user computing systems 102. In some embodiments, users may interact with elements in the video game or with each other through the video game.

Users may participate in the video game through client game applications 110 implemented on user computing systems 102 associated with the users. Within the game instance of the video game executed by the game engine 112, the users may participate by controlling one or more of an element in the virtual environment associated with the video game. The user-controlled elements may include avatars, user characters, virtual environment units (for example, troops), objects (for example, weapons, horses, vehicle and so on), simulated physical phenomena (for example, wind, rain, earthquakes, or other phenomena), or other user-controlled elements.

The user-controlled character avatars may represent the users in the virtual environment. The user characters may include heroes, knights, commanders, leaders, generals or any other virtual environment entities that may possess strength, skills, abilities, magic powers, knowledge, or any other individualized attributes. The virtual environment units controlled by the user may include troops or any other game entities that may be trained, recruited, captured, or otherwise acquired by the users in groups or en-mass. The objects controlled by the users may include weapons, vehicles, projectiles, magic items, wardrobes, boots, armor, knapsacks, medicine, healing potion, or any other virtual items that may be employed by the users for interaction within the video game.

The user-controlled element(s) may move through and interact with the virtual environment (for example, user-virtual environment units in the virtual environment, non-user characters in the virtual environment, other objects in the virtual environment). The user controlled elements controlled by or associated with a given user may be created or customized by the given user. The user may have an "inventory" of virtual goods or currency that the user can use (for example, by manipulation of a user character or other user controlled element, or other items) within the virtual environment.

Controls of virtual elements in the video game may be exercised through commands input by a given user through user computing systems 102. The given user may interact with other users through communications exchanged within the virtual environment. Such communications may include one or more of textual chat, instant messages, private messages, voice communications, or other communications. Communications may be received and entered by the users via their respective user computing systems 102. Communications may be routed to and from the appropriate users through server(s) (for example, through application host system 132).

Execution or performance of the user action by the game engine 112 may produce changes to the game state, which may reflect progresses or results of the user actions. In some examples, state changes caused by the execution of the user actions may be recorded in the application data store 106 or data store 134 to facilitate persistency throughout the instance of the video game. In some examples, execution of the user actions may not produce persistent changes to the game state (for example, a user character jumping forward and backward successively may not produce any perceivable game state changes to other users).

A given user may input commands with specific parameters to undertake specific deeds, actions, functions, spheres of actions or any other types of interactions within the virtual environment. For example, the given user may input commands to construct, upgrade or demolish virtual buildings; harvest or gather virtual resources; heal virtual user-controlled elements, non-player entities or elements controlled by other users; train, march, transport, reinforce, reassign, recruit, or arrange troops; attack, manage, create, demolish or defend cities, realms, kingdoms, or any other virtual environment locations controlled by or associated with the users; craft or transport virtual items; interact with, compete against or along with non-player entities or virtual environment elements controlled by other users in combats; research technologies or skills; mine or prospect for virtual resources; complete missions, quests, or campaigns; exercise magic power or cast spells; or perform any other specific deeds, actions, functions, or sphere of actions within the virtual environment. In some examples, the given user may input commands to compete against elements in an environment within the virtual environment—for example, Player vs. Environment (PvE) activities. In some examples, the given user may input commands to compete against each other within the virtual environment—for example, Player vs. Player (PvP) activities.

The instance of the video game may include virtual entities automatically controlled in the instance of the video game. Such virtual entities may or may not be associated with any user. As such, the automatically controlled virtual entities may be generated or developed by artificial intelligence configured with the game application 110 or server(s) interactive computing system 130 by a provider, administrator, moderator, or any other entities related to the video game. These automatically controlled entities may evolve within the video game free from user controls and may interact with the entities controlled by or associated with the users, other automatically controlled virtual environment entities, as well as the topography of the virtual environment. Certain manifested traits may be associated with the automatically controlled entities in accordance with the artificial intelligence configured with server(s) (for example, application host system 132). As used herein, such automatically controlled virtual environment entities in the instance of the video game are referred to as "non-player entities."

In an online game, the instance of the video game may be persistent. That is, the video game may continue on whether or not individual users are currently logged in or participating in the video game. A user that logs out of the video game and then logs back in some time later may find the virtual environment or the video game has been changed through the interactions of other users with the video game during the time the user was logged out. These changes may include changes to the simulated physical space, changes in the user's inventory, changes in other users' inventories, changes experienced by non-user characters, or other changes.

Interactive Computing System

The interactive computing system 130 may include application host system(s) 132, a data store 134, and a tournament management system 120. The interactive computing system 130 may include one or more computing systems configured to execute a portion of the game application 110. The interactive computing system 130 may enable multiple users or computing systems to access a portion of the game application 110 executed or hosted by the interactive computing system 130. The interactive computing system 130 can have one or more game servers that are configured to host online video games. For example, the interactive computing system 130 may have one or more game servers that are configured to host an instanced (for example, a first person shooter multiplayer match) or a persistent virtual environment (for example, a multiplayer online roll playing game). The virtual environment may enable one or more users to interact with the environment and with each other in a synchronous or asynchronous manner. In some cases, multiple instances of the persistent virtual environment may be created or hosted by one or more game servers. A set of users may be assigned to or may access one instance of the virtual environment while another set of users may be assigned to or may access another instance of the virtual environment. In some embodiments, the interactive computing system 130 may execute a hosting system for executing various aspects of a game environment. For example, in one embodiment, the game application 110 may be a competitive game, such as a first person shooter or sports game, and the interactive computing system 130 can provide a dedicated hosting service (such as, through the game servers) for hosting multiplayer game instances or facilitate the creation of game instances hosted by user computing devices.

Tournament Management System

The tournament management system 120 can be configured to manage a tournament framework. The tournament management system 120 can determine the number of matches that are to be played within a tournament, matchmaking between players/teams within the tournament, and rankings of players/teams. The tournament management system 120 can determine how players/teams can generate points, such as the point values for actions performed by players within the tournament. The tournament management system 120 can determine the type of telemetry data that is used to calculate points. The tournament management system 120 can determine the algorithms that are used to determine how players/teams score points during a tournament. The tournament management system 120 can determine point thresholds and victory conditions for the tournament. For example, the tournament management system 120 can determine a point threshold for a match point gameplay match and the victory condition for winning the tournament.

The interactive computing system 130 and/or tournament management system 120 may be configured to manage the game tournament. The tournament management system 120 can be configured to set up play schedules for each player/team and determine when to instantiate matches for the players that are competing within the tournament. The tournament management system 120 can be configured to determine which teams/players will be playing in each match. The tournament can be for any type of computing system, such as a console (for example, PlayStation, Xbox, or Nintendo consoles) or a personal computer (PC). The video game can be any type of multiplayer games in which multiple players can compete simultaneously. The tournament management system 120 can provide instructions to the interactive computing system 130 to conduct the gameplay matches in accordance with the tournament framework. This can include organizing the gameplay matches, calculating points, determining when to conduct a match point gameplay match, and determine the winner of the tournament, among other functions.

Tournament Player Data

Figure 2:
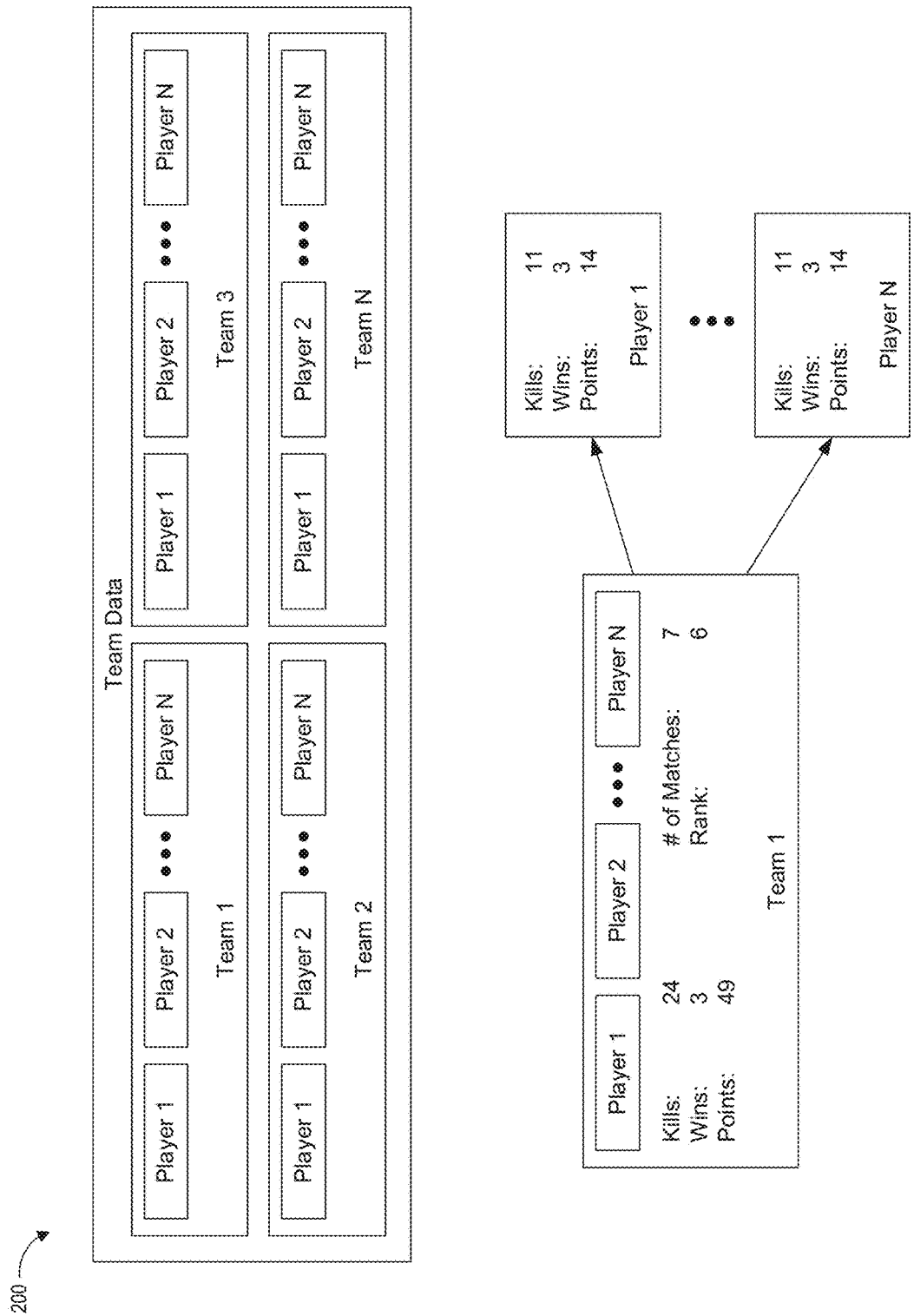
FIG. 2 illustrates an embodiment of teams and player data collected during a tournament.

FIG. 2 illustrates an embodiment 200 of player/team data that can be generated during a tournament. Each player/team within a tournament can be ranked and statistics associated with the team/player can be generated based on the performance of the players within tournament gameplay sessions. The points, ranking, and/or other data associated with the performance of a player and/or team can be referred to as a performance metric. During a tournament, the data may include a player performance metric and a team performance metric. The performance metric maybe be provided as a single value, such as a total point value or total score accumulated by the player or team, or may be represented by multiple values such as the performance data illustrated in FIG. 2. The team value may be an aggregate of the total points accrued by each team member. In some embodiments, the team score may be determined using other criteria, such as an average value per player. The data or at least a portion of the data may be available to the players and/or viewers during the tournament. For example, the players may be able to see the total number of points accumulated by each team within the tournament. In some instances, only the ranking for each team may be visible without displaying the number of points calculated for a specific player/team. The statistics associated with a player/team may be displayed without assigning point values to the specific statistics. For example, a total number of kills may be displayed, but not the point value associated with the kills. In the illustrated embodiment, the team data provides a listing of teams and players. The data may be broken down into various sublevels, such as by teams, and further by individual players. Any portion of the player data may be revealed to players as part of the tournament process.

Tournament Management Process

Figure 3:
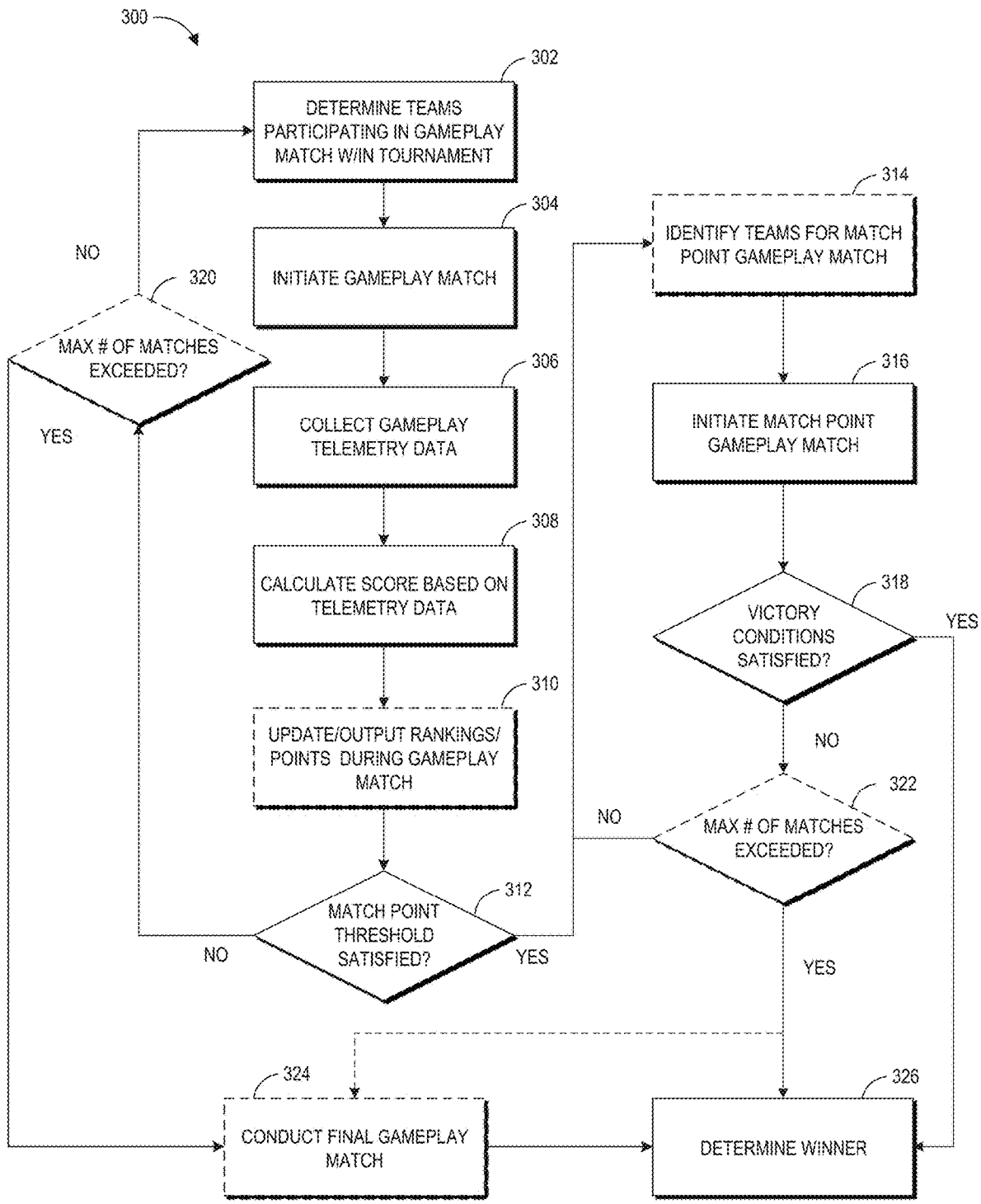
FIG. 3 illustrates an embodiment of a flow diagram of a method for executing a tournament system.

FIG. 3 illustrates an embodiment of a flow diagram of a method 300 for managing a virtual tournament within a game application. The process 300 can be implemented by a computing system configured to manage data associated with a multiplayer video game application. The process 300, in whole or in part, can be implemented by, for example, a tournament management system 120, one or more user computing system 102, or an interactive computing system 130, among others. Although any number of systems, in whole or in part, can implement the process 300, to simplify discussion, the process 300 will be described with respect to particular systems.

At block 302, the tournament management system 120 can determine the teams and/or players participating in each gameplay match within the tournament. The system for determining matches may be determined based on defined matchmaking processes. In some embodiments, the matches may be based on the number of players in the tournament and the type of game. The number of players that can play within a gameplay match may limit the number of players/teams within a tournament. The tournament may include more players that can be fit within a single match. In which case, the tournament management system 130 can use matchmaking algorithms for determining how to structure the gameplay matches. The schedule may be static, such that, once it is determined, it does not change. In some embodiments, the tournament matchmaking may be more dynamic, where the matches are determined based on an ongoing calculation of the points accumulated by players within the tournament. For example, the tournament may be configured to attempt to dynamically balance matches based on the points associated with the different teams during the tournament. In some embodiments, the gameplay matches may be static until the point threshold is satisfied by a player or team. After which, the tournament management system 130 may dynamically populate matches for the match point gameplay match, as will be further described herein.

After the tournament management system 120 determines the players/teams that will be playing within a given match within the tournament, the process proceeds to block 304 when the gameplay match is scheduled to start.

At block 304, the tournament management system 120 can initiate a gameplay match that includes the scheduled or determined players or teams. The tournament management system 120 can provide instructions to the interactive computing system 130 to initiate the gameplay match with the determined teams and/or players in accordance with the tournament schedule.

At block 306, the tournament management system 120 can coordinate with the interactive computing system 130 to collect the telemetry data of the players during the gameplay match. The telemetry data can be used to calculate points for a specific gameplay match. The tournament management system 120 can collect data such as the winning player or team, damage output, damage received, number of kills, number of items collected, time alive, times revived, knock downs, respawns, supply drop opening, winning/placement, killstreaks, champion kill, kill leader kills, the distance traveled within the virtual environment, and/or other telemetric gameplay data collected by the interactive computing system 130 during the gameplay match.

At block 308, the tournament management system 120 can calculate the performance metric associated with each player or team based on determined scoring metrics and/or algorithms. The information associated with the actions performed by virtual characters within the game can be determined based on the telemetry data that is collected during runtime of the gameplay match. In some instances, specific types of actions may have a maximum amount of points that can be acquired for that type of action. The maximum may be within a gameplay match or over the course of the whole tournament. For example, some achievements or feats may be performed that will generate points, but may only be performed a single time during the course of the tournament. Whereas, other scoring events, such as the number of kills and the points associated with the kills may increase in value as kills increase within a single match in order to signify the increased difficulty of accruing more kills within a single gameplay match.

The tournament management system 120 can use the telemetry data to determine aspects of the gameplay of the characters that may not be readily discernable to viewers. For example, points may be awarded to the player that travels the farthest distance during a gameplay match, or to the player that has a kill shot from the farthest distance. Many of these actions performed by the virtual characters would not be able to be used in the points calculations without the telemetry data. In this manner, the tournament management system 120 can automatically determine points within the gameplay match without requiring that a scorekeeper actively monitor the gameplay. Additionally, for instances where it would be difficult to tell what occurred within a game application, the telemetry data can be used to identify the virtual character that performed an action (e.g., a kill shot) and should be awarded for performing the action.

At block 310, optionally, a value of the performance metric, such as total score associated with a player can be automatically updated during the gameplay match. The ongoing telemetry data and calculation of the points associated with a character can be determined and output in a manner such that it can be broadcast to other characters within a gameplay match. For example, the telemetry data is output to the tournament management system 120 for scoring, the score is calculated during the gameplay match, and during the gameplay match the score of the player is updated and returned to the interactive computing system 130 for display within the gameplay match. This updated score information may be output within the user interface of the computing system of players within that gameplay match. For example, a scorecard menu for players may be accessible within the game application that may be activated by a player. Depending on the event, the interactive computing system 130 may be configured to trigger some type of auditory or visual effects within the gameplay sessions that are displayed to the player earning the points and/or to other players within the gameplay match. For example, when a player becomes the new high points leader, an announcement within the game may indicate that the player is the new high points leader, or the interactive computing system 130 may indicate that a player or team has crossed the match point threshold for proceeding on to the victory condition phase of the tournament.

At block 312, after a match has been completed, the tournament management system 120 determines whether a player or team has satisfied the match point threshold for progressing to the next stage of the tournament. If the player or team has satisfied the points threshold, the player or team will move to the match point gameplay match. During the match point gameplay match, only players or teams that have satisfied the match point threshold can attempt to win the tournament. The match point gameplay match provides a thrilling conclusion to the end of the tournament such that teams or players do not automatically win the tournament by achieving the points threshold within the tournament. Once the points threshold has been satisfied the player may progress to the match point stage of the gameplay match. Having one team or player acquire match point status does not preclude other players or teams from acquiring match point status. Once a team acquires match point status, they trigger a final win or tournament victory condition for subsequent matches. Each tournament can have a defined victory condition for the match point gameplay match. For example, the match point gameplay match victory condition may require the team or player to win a gameplay match, or the victory condition may require the team to achieve a specific objective on the map that becomes unlocked once the threshold has been satisfied.

If no players or teams achieve the threshold after the match, the process can return to 302, and the tournament management system 120 can determine the next match to be conducted within the tournament. Optionally, at block 320, the tournament management system 120 can check to determine whether a maximum number of matches associated with a tournament have been completed. The maximum number of matches may be for the tournament as a whole or just the current state of play, such as pre match point gameplay match, or post match point gameplay match. In some embodiments, if the maximum number of matches, minus one, has been reached, the tournament management system 120 can instruct the interactive computing system 130 to implement a final match at block 324. This same check can be conducted at block 322, as will be discussed below. If no final match is to be implemented, and the maximum number of matches has been exceeded, then the process can proceed directly to block 326 and determine the winner of the tournament based At block 314, optionally, the tournament management system 120 may filter the teams once the match point threshold has been satisfied. For example, once a team or player reaches the threshold points, all teams or players in excess of the total number of teams or players that can play in a single match may be cut from the tournament based on their respective rankings within the tournament (e.g., based on the total number of points accrued). In some instances, the tournament management system 120 may have a lower point threshold for the participation of teams within a match point gameplay match. This may be done so that lower tier teams or players that are not good enough do not participate in the match point gameplay match. The composition and matchmaking for future match point gameplay matches may be dynamically updated once the match point threshold has been satisfied by at least one team or player.

At block 316, the interactive computing system 130 can conduct a match point gameplay match. The match point gameplay match may be exactly the same as any other gameplay match completed during tournament. In some embodiments, there may be audio and/or visual changes to the presentation of the gameplay match in order to signify that the gameplay match is the match point gameplay match. For example, there may be a specific logo or event that occurs during the match to indicate to the player that a team(s) have crossed the threshold and will win the tournament if the victory conditions are satisfied. The victory condition for the players or teams that have match point status can be referred to as a series termination condition. The victory condition for the players or teams that do not have match point status can be referred to as a match termination condition. In some embodiments, the series termination condition and the match termination condition can be the same. In some embodiments, the series termination condition and the match termination condition can be different. For example, the series termination condition may require the players or teams acquire a plurality of tokens during the match and win the match, whereas the match termination condition may occur when the players or team wins the match. In some instances, a match point player or team may satisfy the match termination condition, but not satisfy the series termination condition. In such a case, another match point gameplay session would be played. In some embodiments, the gameplay of the game application may be changed or modified during the match point gameplay match. For example, in a battle royale game, the speed at which the map shrinks may be increased during the match point gameplay match. In some embodiments, there can be indications provided to other players during the gameplay match that a player or team has match point status. For example, a scoreboard menu may indicate each player or team that has achieved match point status. In some embodiments, the characters of the players or teams that have achieved match point status may have an indication within the virtual environment that indicates to other players the match point status. For example, the character may have a different color skin (e.g., highlighted in gold), different in-game character indicator (e.g., a star instead of a triangle), and/or other visual indicator perceptible to other players during the game point gameplay match.

At block 318, the tournament management system 120 determines whether the victory conditions have been satisfied. Generally, it will be apparent who has satisfied the victory conditions. If the victory conditions are satisfied, then the tournament management system 120 will determine the winner and end the tournament at block 326. In some instances, the tournament may continue after a winner is determined in order to determine the placings of other competitors within the tournament (e.g., $2^{nd}$ place, $3^{rd}$ place, etc.). If the victory conditions are not satisfied, the process will proceed to conduct additional match point gameplay matches. During these matches, additional players may continue to satisfy the point threshold for enabling victory conditions for the other teams. In this manner the tournament can continue to build excitement until the tournament ends. In some instances, at block 322, the tournament management system 120 may determine whether a maximum number of match point gameplay matches has been completed. Optionally, if the maximum, minus one, has been reached, the process can proceed to block 324 to conduct a final match. If a final match is not to be conducted, the process can proceed directly to block 326 and determine the winner based on another At block 324, optionally, a final gameplay match may be conducted to determine champion for the tournament, the final match may be implemented based on the restraints and requirements of the game application or tournament management system 120. The final match may be a sudden death match where the winner is the tournament champion. The final match may be configured so that the match point victory condition is activated for all players or teams regardless of their accumulated points. Based on the outcome of the final match, the winner of the tournament can be determined at block 326. If a final gameplay match is not to going to be implemented, the process can proceed to block 326 to determine the winner.

At block 326, the winner of the tournament is determined. The winner can be determined based on which player or team satisfied the match point gameplay match victory condition. In instances where no player or team satisfied the victory condition at block 318, the winner of the tournament can be determined based on alternative victory criteria. For example, the player or team with the highest points or the team that satisfied victory conditions during a final match at block 324 could be the determined winner of the tournament.

Overview of Computing Device

Figure 4:
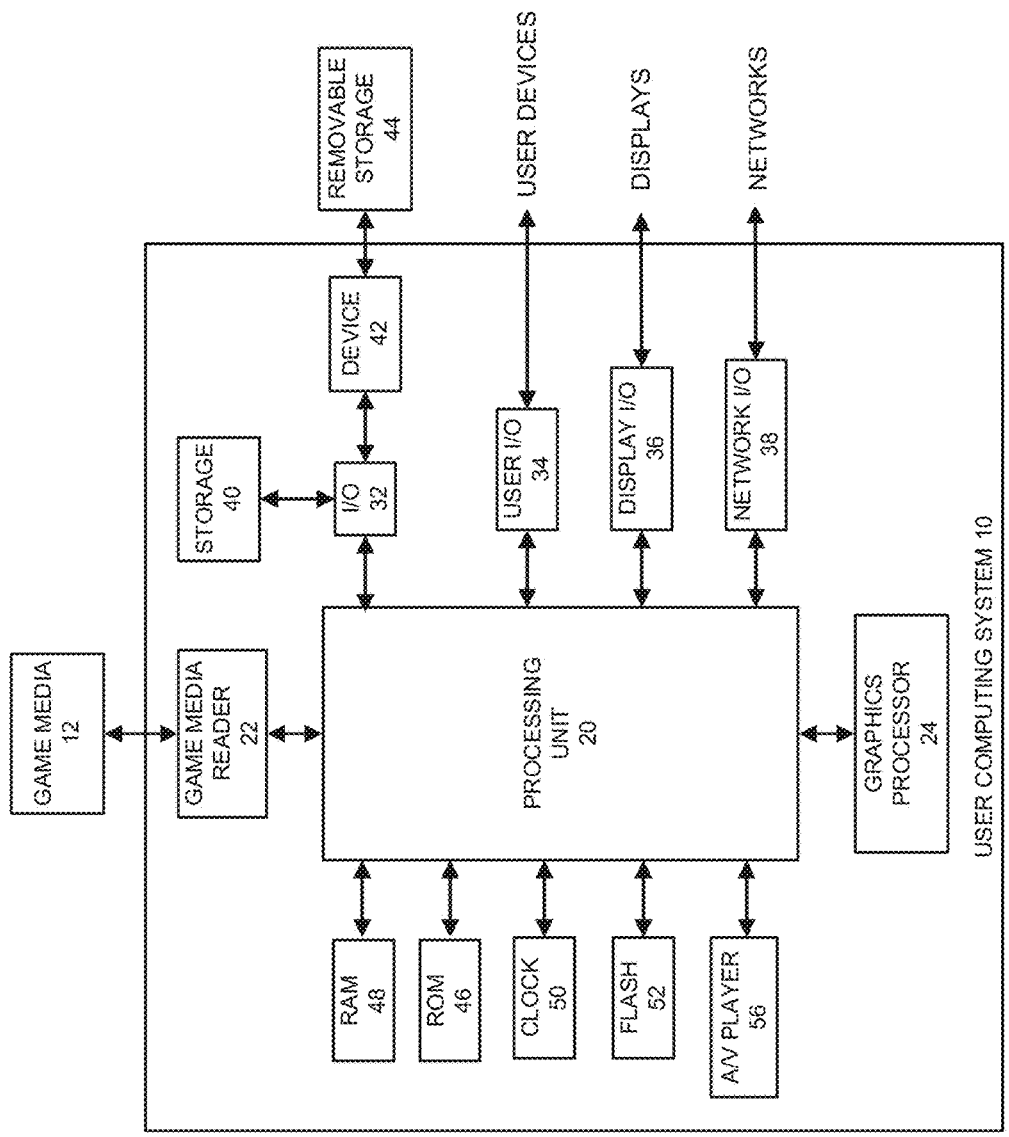
FIG. 4 illustrates an embodiment of a computing system configured to implement the request distribution system.

FIG. 4 illustrates an embodiment of computing device 10 according to the present disclosure. Other variations of the computing device 10 may be substituted for the examples explicitly presented herein, such as removing or adding components to the computing device 10. The computing device 10 may include a game device, a smart phone, a tablet, a personal computer, a laptop, a smart television, a car console display, a server, and the like. As shown, the computing device 10 includes a processing unit 20 that interacts with other components of the computing device 10 and also external components to computing device 10. A media reader 22 is included that communicates with media 12. The media reader 22 may be an optical disc reader capable of reading optical discs, such as CD-ROM or DVDs, or any other type of reader that can receive and read data from game media 12. One or more of the computing devices may be used to implement one or more of the systems disclosed herein.

Computing device 10 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a handheld video game device, a dedicated game console computing system, a general-purpose laptop or desktop computer, a smart phone, a tablet, a car console, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data, such as game state data and any shared data files. In addition to storage 40 and removable storage media 44, computing device 10 is also shown including ROM (Read-Only Memory) 46 and RAM 48. RAM 48 may be used for data that is accessed frequently.

User I/O 34 is used to send and receive commands between processing unit 20 and user devices, such as game controllers. In some embodiments, the user I/O can include a touchscreen inputs. The touchscreen can be capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game.

Display output signals produced by display I/O 36 comprising signals for displaying visual content produced by computing device 10 on a display device, such as graphics, user interfaces, video, and/or other visual content. Computing device 10 may comprise one or more integrated displays configured to receive display output signals produced by display I/O 36. According to some embodiments, display output signals produced by display I/O 36 may also be output to one or more display devices external to computing device 10, such a display 16.

The computing device 10 can also include other features that may be used with a game, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10.

Program code can be stored in ROM 46, RAM 48 or storage 40 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads media 12 and provides an application, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method for dynamically controlling execution of a series of multi-user gameplay sessions of a game application, the method comprising:
   by a server computing system comprising at least one hardware processor configured with computer executable instructions,
   receiving data associated with a plurality of users executing a game application;
   determining a first plurality of users of the plurality of users to participate in a gameplay session within the game application;
   initiating the gameplay session, wherein the gameplay session includes the first plurality of users controlling virtual characters within a shared instantiation of a virtual environment of the game application;
   receiving telemetric data associated with operation of the virtual characters of each of the first plurality of users during the gameplay session;
   calculating a performance metric for each of the first plurality of users based at least in part on the telemetric data received during the gameplay session;
   determining whether a match point threshold for the performance metric is satisfied after the gameplay session;
   based on a determination that the match point threshold has been satisfied by at least one user,
   updating a user status to an indicate a match point status, wherein match point status indicates that the match point threshold has been satisfied; and
   initiating a match point gameplay session, wherein the match point gameplay session includes a series termination condition and a match termination condition, wherein the series termination condition is achievable by users having match point status.

2. The computer-implemented method of claim 1 further comprising, based on at least one user satisfying the match termination condition, instantiating a subsequent match point gameplay session.

3. The computer-implemented method of claim 1 further comprising, based on at least one user satisfying the series termination condition, providing an indication of the at least one user satisfying the series termination condition to the plurality of users and terminate the series of gameplay sessions.

4. The computer-implemented method of claim 1, wherein the plurality of users are grouped into teams of two or more users, and determining whether a match point threshold for the performance metric is satisfied after the gameplay session further comprises determining whether the performance metric associated with the team satisfies the match point threshold.

5. The computer-implemented method of claim 1, wherein the performance metric comprises at least one of a score value or a ranking relative to other users or the plurality of users.

6. The computer-implemented method of claim 1, wherein telemetry data provides an indication of actions performed by virtual characters during the gameplay session, wherein different action performed by virtual characters provide different incremental values for the performance metric.

7. The computer-implemented method of claim 1 further comprising determining whether a threshold number of gameplay sessions had been satisfied for the series of gameplay sessions, and conduct a final gameplay session having a second series termination condition satisfiable by each user participating in the final gameplay session.

8. The computer-implemented method of claim 1 further comprising updating the performance metric during the gameplay session.

9. The computer-implemented method of claim 8 further comprising providing at least one of auditory or visual output to users within the gameplay session when updating the performance metric of one or more users.

10. The computer-implemented method of claim 1 further comprising providing at least one of auditory or visual output associated with a virtual character of a user having match point status.

11. A server computing system for dynamically controlling execution of a series of multi-user gameplay sessions of a game application:
by a one or more hardware processors configured with computer executable instructions that configure the server computing system to:
receive data associated with a plurality of users executing a game application;
determine a first plurality of users of the plurality of users to participate in a gameplay session within the game application;
initiate the gameplay session, wherein the gameplay session includes the first plurality of users controlling virtual characters within a shared instantiation of a virtual environment of the game application;
receive telemetric data associated with operation of the virtual characters of each of the first plurality of users during the gameplay session;
calculate a performance metric for each of the first plurality of users based at least in part on the telemetric data received during the gameplay session;
determine whether a match point threshold for the performance metric is satisfied after the gameplay session;
based on a determination that the match point threshold has been satisfied by at least one user,
update a user status to an indicate a match point status, wherein match point status indicates that the match point threshold has been satisfied; and
initiate a match point gameplay session, wherein the match point gameplay session includes a series termination condition and a match termination condition, wherein the series termination condition is achievable by users having match point status.

12. The server computing system of claim 11, wherein the computer executable instructions further configure the one or more hardware processors to, based on at least one user satisfying the match termination condition, instantiate a subsequent match point gameplay session.

13. The server computing system of claim 11, wherein the computer executable instructions further configure the one or more hardware processors to, based on at least one user satisfying the series termination condition, provide an indication of the at least one user satisfying the series termination condition to the plurality of users and terminate the series of gameplay sessions.

14. The server computing system of claim 11, wherein the plurality of users are grouped into teams of two or more users, and the computer executable instructions further configure the one or more hardware processors to determine whether the performance metric associated with the team satisfies the match point threshold when determining whether a match point threshold for the performance metric is satisfied after the gameplay session.

15. The server computing system of claim 11, wherein the performance metric comprises at least one of a score value or a ranking relative to other users or the plurality of users.

16. The server computing system of claim 11, wherein telemetry data provides an indication of actions performed by virtual characters during the gameplay session, wherein different action performed by virtual characters provide different incremental values for the performance metric.

17. The server computing system of claim 11, wherein the computer executable instructions further configure the one or more hardware processors to determine whether a threshold number of gameplay sessions had been satisfied for the series of gameplay sessions, and conduct a final gameplay session having a second series termination condition satisfiable by each user participating in the final gameplay session.

18. The server computing system of claim 11, wherein the computer executable instructions further configure the one or more hardware processors to update the performance metric during the gameplay session.

19. The server computing system of claim 18, wherein the computer executable instructions further configure the one or more hardware processor to provide at least one of auditory or visual output to users within the gameplay session when updating the performance metric of one or more users.

20. The server computing system of claim 11, wherein the computer executable instructions further configure the one or more hardware processors to provide at least one of auditory or visual output associated with a virtual character of a user having match point status.

\* \* \* \* \*